(No Model.)
J. W. MILLER.
CROSS CUT SAW HANDLE.
No. 487,371. Patented Dec. 6, 1892.
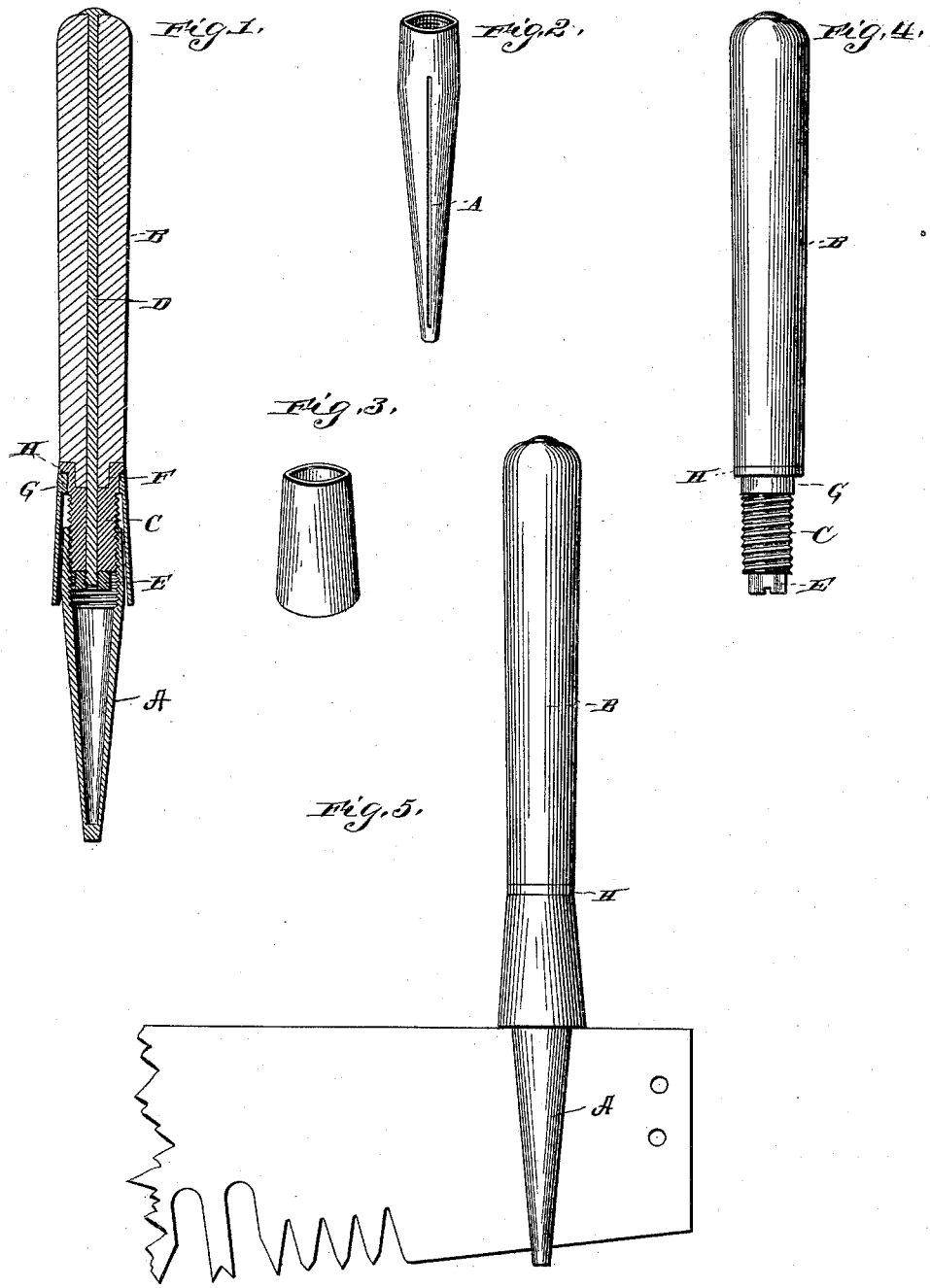

UNITED STATES PATENT OFFICE.

JOHN WATT MILLER, OF PENFIELD, PENNSYLVANIA.

CROSSCUT-SAW HANDLE.

SPECIFICATION forming part of Letters Patent No. 487,371, dated December 6, 1892.

Application filed November 14, 1891. Serial No. 411,965. (No model.)

*To all whom it may concern:*

Be it known that I, JOHN WATT MILLER, a citizen of the United States, residing at Penfield, in the county of Clearfield and State of Pennsylvania, have invented a new and useful Crosscut-Saw Handle, of which the following is a specification.

My invention relates to an improvement in handles for crosscut-saws, the object being to make provision for strength and quick adjustment of the parts, whereby but little time is required in which to apply the handle or to remove it from the saw-blade, and when secured in place the fastening is rigid and not likely to work loose or become weak as a result of the constant strain brought to bear upon it when in use.

With this end in view my invention consists, essentially, in three parts capable of being disassembled at pleasure or of being as speedily assembled when occasion may require it. These parts are a shank or loop slotted in the usual manner to receive the saw-blade and provided with a threaded socket at one end, a ferrule fitted around the socket end of the shank or loop and adapted to be forced down thereon in contact with the saw-blade, and a handle proper having a screw-threaded inner end adapted to screw into the socket and provided with a shoulder adjacent to the screw-threaded portion and adapted to abut against the ferrule when the handle is screwed far enough into the socket in order to force the ferrule against the saw-blade.

It further consists in certain novel features of construction and combinations of parts, as will be hereinafter described, and pointed out in the claims.

In the accompanying drawings, Figure 1 is a sectional view through the entire device, showing the relative position of the parts when together. Fig. 2 is a detached view of the slotted shank or loop. Fig. 3 is a similar view of the ferrule. Fig. 4 is a similar view of the handle proper, and Fig. 5 is a view in elevation showing the handle applied to a saw-blade.

A represents the shank or loop, it being provided in the usual manner with a slot or slit adapted to receive the saw-blade, as shown in Fig. 5. This shank or loop is bored out and screw-threaded internally at one end to form a socket, and the exterior of this portion is preferably tapered, as shown in Figs. 1 and 2.

B indicates the handle proper, usually turned from wood and bored out through its longitudinal center. Fitted to the inner end F of this wooden handle is a threaded screw C. The screw is also provided with a central hole, and a bolt is passed through the handle and screw, it having a head on its outer end and threaded on the opposite end to receive a nut, whereby parts are held securely together. A portion of the screw C is so constructed that it forms a continuation of the handle proper, and the screw end being smaller an annular shoulder H is formed between them. A ferrule G is fitted over the tapering end of the shank or loop, its smaller end fitting the screw and hence adapted to be abutted by the annular shoulder when the screw is driven into the socket in the shank or loop. In this manner the parts are forced and locked in position.

The handle is applied in the following manner: The handle is unscrewed partly or entirely and the ferrule slipped back, the end of the blade passed into the slot, and then the handle is screwed into the socket as far as possible, driving the ferrule as far as it will go against the upper edge of the saw-blade, as shown in Fig. 5. When thus applied, the fastening is secure and accidental displacement is impossible, and at the same time the parts are firm and strong and will withstand an unusual amount of strain and punishment.

Having fully described my invention, what I claim as new, and desire to secure by Letters Patent, is—

1. As an article of manufacture, a saw-handle consisting of a slotted shank or loop having an internally-screw-threaded socket formed at one end, a handle proper provided with a screw-threaded end of less diameter than the remaining portion of the handle, so that a shoulder is formed between them, and a ferrule fitted over the socket end of the shank and adapted to be driven against the saw-blade held in the shank, the upper end of the ferrule fitted to the restricted end of the handle proper and its exterior flush with the exterior of the handle proper, substantially as set forth.

2. As an article of manufacture, a saw-handle comprising a shank or loop having a slot therein adapted to receive a saw-blade and provided at one end with an internally-screw-threaded socket, a ferrule fitted over the socket end of the shank or loop and provided with an internal annular shoulder adapted to strike the end of the socket, and a handle proper having a threaded portion adapted to turn in the socket and provided with a shoulder which bears on the adjacent end of the ferrule for the purpose of forcing the ferrule against the saw-blade, substantially as set forth.

3. As an article of manufacture, a saw-handle comprising a slotted shank or loop provided with an internally-screw-threaded socket at one end, a ferrule fitted over this socket end, and a handle proper having a hole formed through its longitudinal center, a screw fitted on one end of the handle proper, having a hole through its longitudinal center in alignment with the hole in the handle proper, a bolt passed through these holes, having a screw-threaded end, and a nut screwed on this end, whereby to hold the screw on the handle proper, substantially as set forth.

J. WATT MILLER.

Witnesses:
E. C. HURNES, Jr.,
E. C. BROWN.